(12) United States Patent
Adelson

(10) Patent No.: US 9,607,283 B1
(45) Date of Patent: *Mar. 28, 2017

(54) MACHINE OR GROUP OF MACHINES FOR MONITORING LOCATION OF A VEHICLE OR FREIGHT CARRIED BY A VEHICLE

(71) Applicant: MacroPoint LLC, Cleveland, OH (US)

(72) Inventor: Bennett H. Adelson, Highland Heights, OH (US)

(73) Assignee: MacroPoint LLC., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/249,825

(22) Filed: Aug. 29, 2016

Related U.S. Application Data

(63) Continuation of application No. 14/987,707, filed on Jan. 4, 2016, now Pat. No. 9,429,659, which is a continuation of application No. 14/752,005, filed on Jun. 26, 2015, now abandoned, which is a continuation of application No. 14/661,774, filed on Mar. 18, 2015, now Pat. No. 9,087,313, which is a continuation of application No. 14/069,364, filed on Oct. 31, 2013, now Pat. No. 9,070,295, which is a continuation of application No. 13/613,321, filed on Sep. 13, 2012, now Pat. No. 8,604,943, which is a continuation of application No. 13/429,618, filed on Mar. 26, 2012, now Pat. No. 8,330,626.

(51) Int. Cl.
| | | |
|---|---|---|
| G08B 21/00 | (2006.01) |
| G06Q 10/08 | (2012.01) |
| G01S 19/13 | (2010.01) |
| G01S 19/46 | (2010.01) |
| G08G 1/13 | (2006.01) |

(52) U.S. Cl.
CPC .......... G06Q 10/0833 (2013.01); G01S 19/13 (2013.01); G01S 19/46 (2013.01); G08G 1/13 (2013.01)

(58) Field of Classification Search
CPC ....... G06Q 10/0833; G08G 1/20; G08G 1/205
USPC .................................................. 340/988–994
See application file for complete search history.

(56) References Cited

U.S. PATENT DOCUMENTS

| | | |
|---|---|---|
| 5,774,876 A | 6/1998 | Woolley et al. |
| 5,794,174 A | 8/1998 | Janky et al. |
| 6,442,391 B1 | 8/2002 | Johansson et al. |

(Continued)

OTHER PUBLICATIONS

Non-final Office Action of corresponding U.S. Appl. No. 13/409,281, dated May 15, 2012.

(Continued)

*Primary Examiner* — Mark Rushing
(74) *Attorney, Agent, or Firm* — Renner, Otto, Boisselle & Sklar, LLP.

(57) ABSTRACT

A machine or group of machines for monitoring location of at least one of a vehicle or freight carried by the vehicle includes a server comprising a central processing unit, a memory, a clock, and a server communication transceiver that receives location information of a mobile device, the mobile device comprising a GPS receiver, a microprocessor and a wireless communication transceiver coupled to the GPS receiver, the mobile device comprising the GPS receiver programmed to receive data sent by a plurality of GPS satellites, calculate location information of the mobile device comprising the GPS receiver and transmit the location information.

30 Claims, 10 Drawing Sheets

(56) References Cited

U.S. PATENT DOCUMENTS

| | | |
|---|---|---|
| 7,366,522 B2 | 4/2008 | Thomas |
| 8,301,158 B1 | 10/2012 | Thomas |
| 8,369,867 B2 | 2/2013 | Van Os et al. |
| 8,649,775 B2 | 2/2014 | Alessio et al. |
| 8,718,672 B2 | 5/2014 | Xie et al. |
| 8,755,823 B2 | 6/2014 | Proietti et al. |
| 2006/0187027 A1 | 8/2006 | Smith |
| 2008/0132252 A1 | 6/2008 | Altman et al. |
| 2009/0017803 A1 | 1/2009 | Brillhart et al. |
| 2009/0030770 A1 | 1/2009 | Hersh et al. |
| 2009/0143079 A1 | 6/2009 | Klassen et al. |
| 2010/0228404 A1 | 9/2010 | Link et al. |
| 2011/0001638 A1 | 1/2011 | Pudar |
| 2011/0063138 A1 | 3/2011 | Berkobin et al. |
| 2012/0265433 A1 | 10/2012 | Viola et al. |

OTHER PUBLICATIONS

Notice of Allowance of corresponding U.S. Appl. No. 13/409,281, dated Jun. 28, 2012.

Non-final Office Action of corresponding U.S. Appl. No. 13/613,321, dated Jan. 31, 2013.

Final Office Action of corresponding U.S. Appl. No. 13/613,321, dated Jul. 1, 2013.

Notice of Allowance of corresponding U.S. Appl. No. 13/613,321, dated Oct. 4, 2013.

Non-final Office Action of corresponding U.S. Appl. No. 14/069,364, dated Feb. 12, 2015.

Notice of Allowance of corresponding U.S. Appl. No. 13/429,618, dated Mar. 26, 2012.

Notice of Allowance of corresponding U.S. Appl. No. 14/661,774, dated May 27, 2015.

Hurcom, Stephen; "Tracking to Keep Trucking", www.mapinfo.com; Jun. 27, 2003.

Britton, Diana; "A Mobile Industry: Cell Phones Useful to Stay Connected With Drivers", www.truckinginfo.com; Oct. 2009.

Non-final Office Action of corresponding U.S. Appl. No. 14/752,005, dated Dec. 3, 2015.

Non-final Office Action of corresponding U.S. Appl. No. 14/987,707, dated Apr. 27, 2016.

Non-final Office Action of corresponding U.S. Appl. No. 14/987,707, dated Mar. 7, 2016.

MACHINE OR GROUP OF MACHINES FOR MONITORING LOCATION OF A VEHICLE OR FREIGHT CARRIED BY A VEHICLE

TECHNICAL FIELD

The present disclosure relates to a machine or group of machines for monitoring location.

BACKGROUND

Location information is becoming more important and prevalent.

In one example application of the use of location information, carriers, shippers, freight hauling services providers, third-party logistics service providers and courier services providers as well as other logistics and freight service providers (freight hauling) benefit from monitoring the location of vehicles in their fleets or under contract. Monitoring the location of vehicles helps improve efficiency because it allows for real-time or near real-time decision making when matching loads with vehicles. For example, by monitoring the location of fleet vehicles, a dispatcher may better understand which vehicle is the most appropriate (e.g., geographically closest, appropriate size, etc.) to send to a location for a load pickup. Conventional systems for monitoring vehicle location have relied on global positioning systems (GPS) to provide the vehicle's location. These systems require a GPS receiver to be installed in each vehicle. Moreover, some of these systems require the installation of additional dedicated equipment in each vehicle.

In addition, at least in part due to limitations of conventional systems for monitoring vehicle location, a common practice in the vehicle location monitoring services industry is to charge a user a standard flat monthly fee for monitoring services. This practice may represent a substantial cost to a user or organization that, for example, may wish to monitor a relatively small number of vehicles or a relatively small number of loads for a relatively short amount of time.

SUMMARY

Alternative methods for monitoring location of vehicles include radiolocation techniques including triangulation or multilateration methods that are capable of locating devices in a network. These methods involve the measurement of radio signals between a device and radio towers in the network. The technology, originally intended by telecommunication companies to approximate the location of a mobile phone in case of emergencies, provides the location of a device in the network.

The use of all of these location information technologies also raises privacy issues. A user's privacy may be at risk if location information is misused or disclosed without the authorization or knowledge of the user. To address these privacy concerns, various governmental and business organizations have developed rules and guidelines to protect user privacy. For example, the International Association for the Wireless Telecommunications Industry (CTIA) has developed Best Practices and Guidelines for Location-Based Services (the "CTIA Guidelines"), which are hereby incorporated by reference.

The Guidelines provide a framework based on two principles: user notice and consent. Users must receive "meaningful notice about how location information will be used, disclosed and protected so that users can make informed decisions . . . and . . . have control over their location information." Users must also "consent to the use or disclosure of location information" and "have the right to revoke consent . . . at any time."

Although, electronic methods have been developed that make use of web browsers and SMS texting capabilities of mobile devices to provide notification and consent, some of these systems have proved inconvenient and may require advanced mobile devices or extensive user training.

A computer implemented method for monitoring location of a vehicle includes receiving a first electronic signal including data representing a request for information regarding the location of the vehicle, correlating the vehicle to a communications device based at least in part on the communications device being associated with a user who is associated with the vehicle, and transmitting a second electronic signal to a location information provider corresponding to a party or device other than the communications device. The second electronic signal includes data representing a request for location information of the communications device. The computer implemented method for monitoring location of a vehicle further includes receiving a third electronic signal from the location information provider. The third electronic signal includes data representing the location information of the communications device. The computer implemented method for monitoring location of a vehicle further includes correlating the location information of the communications device with the location of the vehicle based at least in part on the communications device being associated with the user who is associated with the vehicle, and transmitting a fourth electronic signal including data representing the location of the vehicle.

Another computer implemented method for monitoring location of a vehicle includes transmitting a request signal requesting location information of a communications device. The request signal is transmitted to a party other than the communications device and the communications device is associated with a user of the communications device who is associated with the vehicle. The computer implemented method for monitoring location of a vehicle further includes receiving a location signal including data indicating the location information of the communications device. The location signal is received from a party other than the communications device and the location information of the communications device is originally obtained using a method not requiring a global position system (GPS) satellite receiver to form part of the communications device. The computer implemented method for monitoring location of a vehicle further includes transforming the location information of the communications device into location information regarding the vehicle based at least in part on the communications device being associated with the user of the communications device who is associated with the vehicle.

A system for monitoring location of a vehicle includes a communications interface configured to communicate electronic signals including: a first electronic signal including data representing a request for the location of the vehicle, the first electronic signal received from a requesting party, a second electronic signal including data representing a request for location information of a communications device, wherein the second electronic signal is transmitted to a location information provider corresponding to a party or device other than the communications device, wherein the communications device is associated with a user of the communications device who is associated with the vehicle, a third electronic signal including data representing the location information of the communications device, wherein the third electronic signal is received from the location information provider corresponding to the party or device other than the communications device, and a fourth electronic signal including data representing the location of the vehicle, the fourth electronic signal transmitted to a receiving party. The system for monitoring location of a vehicle further includes a correlation logic configured to correlate the location information of the communications device to the location of the vehicle based at least in part on the communications device being associated with the user of the communications device who is associated with the vehicle.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

In the present disclosure, embodiments are described in the context of location of freight hauling vehicles. It will be appreciated, however, that the exemplary context of freight hauling vehicles is not the only operational environment in which aspects of the disclosed systems and methods may be used. Therefore, the techniques described in this disclosure may be applied to many types of apparatus, vehicles or devices whose location information may be of interest.

Figure 1:
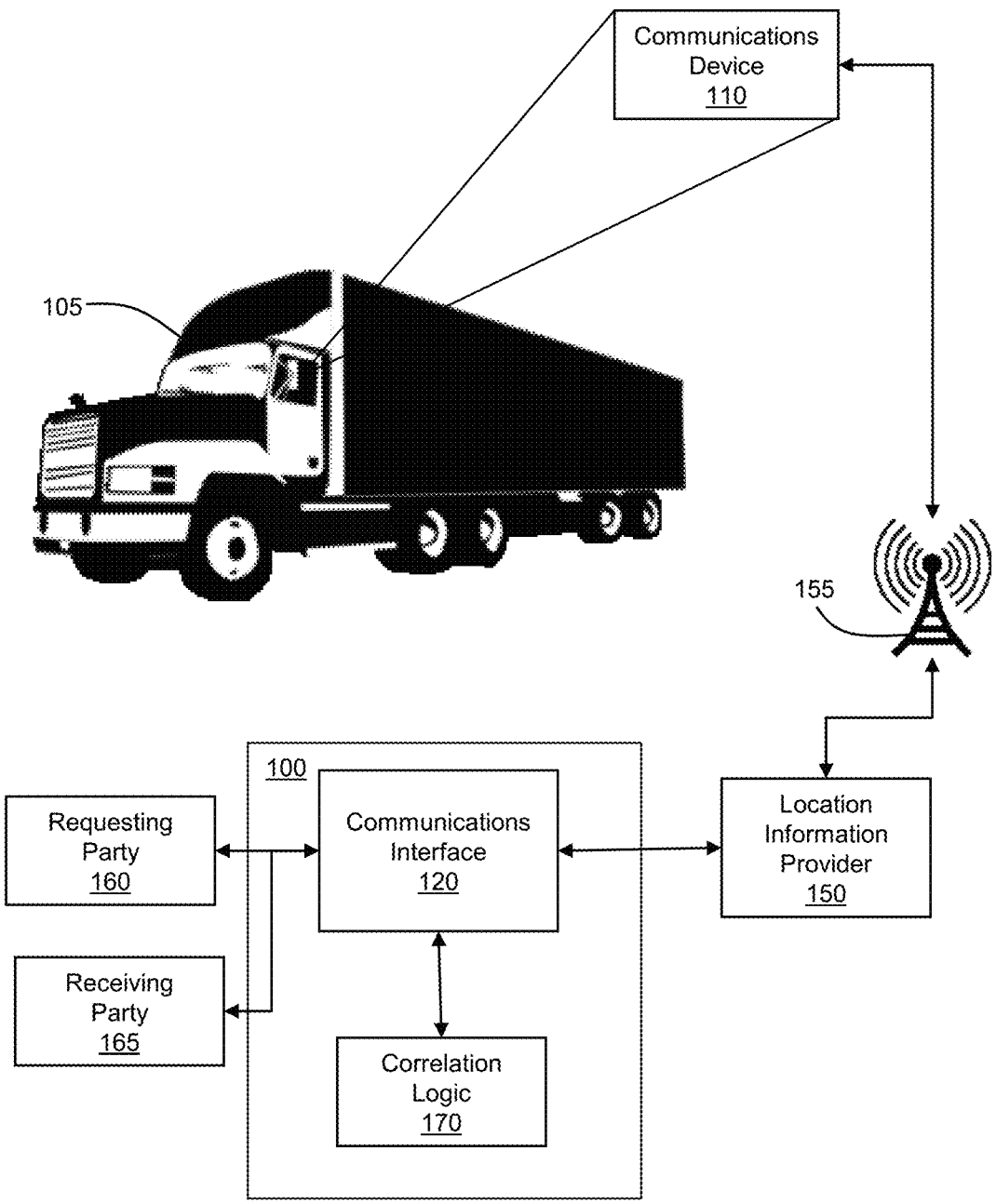
FIG. 1 illustrates an exemplary system for monitoring the location of a vehicle.

FIG. 1 illustrates an exemplary system 100 for monitoring the location of a vehicle 105, which has a communication device 110 within the vehicle 105. The system 100 includes a communications interface 120 that communicates with devices external to the system 100 via electronic signals. For example, the communications logic 120 is configured to communicate with a location information provider 150, a requesting party 160, and a receiving party 165.

The location information provider 150 corresponds to a party or device other than the vehicle 105 and the device 110. The location information provider 150 has access to location of the vehicle 105 or the device 110. In one embodiment, the location information provider 150 is a wireless service provider that provides wireless service in a network 155. In another embodiment, the location information provider 150 is a third party or device that receives the location information of the device 110 from the wireless service provider or from some other party or device. In yet another embodiment, the location information provider 150 is a party other than a wireless service provider or a third party. For example, the party seeking to monitor the location of the vehicle 105, the requesting party 160, may have access to the location information of the device 110. In that case, the requesting party 160 may also be the location information provider 150. In another example, the party operating the system 100 may have access to the location information of the device 110.

The requesting party 160 corresponds to a party or device interested in monitoring the location of the vehicle 105 or on allowing another party to monitor the location of the vehicle 105. The receiving party 165 corresponds to a party or device who receives the location of the vehicle 105 from the system 100 to monitor the location of the vehicle 105. In an example involving freight hauling services providers or freight carriers, a carrier who is interested in monitoring the location of its own vehicles, vehicles under contract, or other vehicles requests the ability to monitor the location of the vehicle 105 for its own consumption. In this case, the carrier is both the requesting party 160 and the receiving party 165. In another example, the requesting party 160 may be a driver interested in sharing the location of his/her vehicle 105 with a carrier to allow the carrier to monitor the location of the vehicle 105. In this case, the driver is the requesting party 160 and the carrier is the receiving party 165. In one embodiment, multiple parties or devices may be interested in monitoring the location of the vehicle 105 or on allowing another party to monitor the location of the vehicle 105. In that case, the communications interface 120 is configured to communicate with multiple requesting parties and/or multiple receiving parties.

The system 100 further includes a correlation logic 170 that correlates the vehicle 105 and the device 110. In one embodiment, the correlation logic 170 correlates the vehicle 105 and the device 110 based at least in part on the vehicle 105 being associated with at least one user who is also associated with the device 110. For example, the user may be associated with the vehicle 105 because the user is the designated driver of the vehicle 105 and the user may be associated with the communications device 110 because the user is under contract with a wireless service provider for the provider to provide wireless service to the communications device 110. In another example, the user is associated with the vehicle 105, with the device 110, or with both in a database or in the correlation logic 170. In another embodiment, the vehicle 105 is directly associated with the communications device 110 without a user being associated with the vehicle 105 or with the device 110.

In an example of the operation of the system 100, the requesting party 160 transmits and the communications interface 120 receives data representing a request from the requesting party 160 for the ability to monitor the location of the vehicle 105. In response to the request from the requesting party 160, the correlation logic 170 correlates the vehicle 105 to the device 110. The communications interface 120 transmits to the location information provider 150 data representing one or more requests for location information of the device 110. In response to a request for location information of the device 110, the location information provider 150 transmits and the communications interface 120 receives data representing the location information of the device 110. The correlation logic 170 correlates the location information of the device 110 to the location of the vehicle 105.

With the location of the vehicle 105 on hand, the communication interface 120 can transmit data representing the location of the vehicle 105 to the receiving party 165 through computer communication. The location of the vehicle 105 may then be displayed in a user interface (not shown). In another embodiment, the communications interface 120 is configured to communicate the location to the receiving party 165 by exposing an application programming interface (API) through which the receiving party 165 can access the location of the vehicle 105. The receiving party 165 can make use of the API to make the information available to its enterprise software (e.g., SAP, Oracle, etc.) for example.

Figure 2:
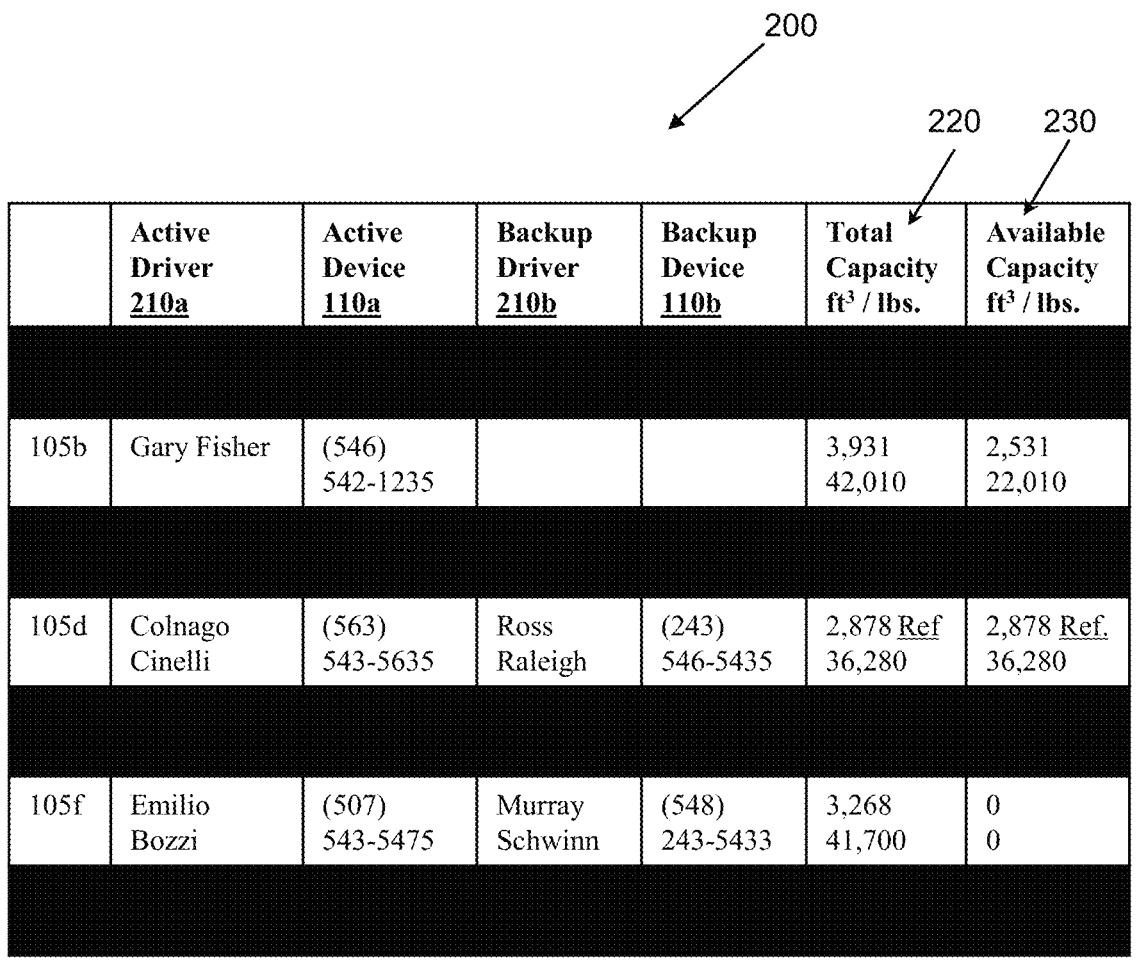
FIG. 2 illustrates a simplified exemplary chart illustrating how a correlation logic may correlate a vehicle to a communications device or the location of the vehicle to the location information of the communications device.

FIG. 2 illustrates a simplified exemplary chart 200 illustrating how the correlation logic 170 may correlate the vehicle 105 to the device 110 or the location of the vehicle 105 to the location information of the device 110. In the illustrated embodiment, for each vehicle 105a-g registered in the system 100, the correlation logic 170 has data fields corresponding to each vehicle 105a-g. The data fields include information regarding the vehicles 105a-g. Potential information that may be included in the data fields include one or more drivers 210a-b associated with each of the vehicles 105a-g and one or more devices 110a-b associated with each of the drivers 210a-b, respectively. The drivers 210a-b are identified by name while the devices 110a-b are identified by an identifier, which in this case corresponds to a telephone number associated with the respective device 110a-b.

In other embodiments, the identifier corresponds to a number or some other identifying information associated with the device 110 other than a telephone number. For example, the identifier may be a mobile identification number (MIN), an electronic serial number (ESN), an International Mobile Equipment Identity (IMEI), an International Mobile Subscriber Identity (IMSI), a Mobile Equipment Identifier (MEID), a Manufacturer's Serial Number (MSN), a Mobile Subscriber Integrated Services Digital Network (MSISDN) number, a Media Access Control (MAC) address, combinations thereof, and so on.

Additional information that may be included in the data fields include the capacity of a vehicle 105a-g (e.g., total volumetric and weight capacity 220, available volumetric and weight capacity 230, etc.), whether the container is refrigerated Ref., and so on.

In the illustrated embodiment, the vehicle 105a is associated with an active driver 210a named Bianchi Campagnolo who is associated with an active device 110a identified by an identifier corresponding to the telephone number (143) 846-5405. The vehicle 105a may also be associated with a backup driver named Bob Haro who is associated with a backup device 110b identified by an identifier corresponding to the telephone number (443) 240-5465. The correlation logic 170 correlates the vehicle 105 with the active driver 210a unless the correlation logic 170 is instructed to instead use the backup driver 210b. In that case, the active driver 210a and the backup driver 210b may switch, with the name listed under backup driver 210b appearing under active driver 210a and vice versa. Similarly, the correlation logic 170 correlates the vehicle 105 with the active device 110a unless the correlation logic 170 is instructed to instead use the backup device 110b. In that case, the active device 110a and the backup device 110b may switch, with the identifier listed under backup device 110b appearing under active device 110a and vice versa. In this way, the correlation logic 170 can transform the location information of the communications device 110 into information regarding the location of the vehicle 105 by correlating the location information of the communications device 110 to the location of the vehicle 105 based at least in part on the communications device 110 being associated with the user who is associated with the vehicle 105. In one embodiment, the correlation logic 170 correlates the vehicle 105 with the active driver 210a and the backup driver 210b.

In the illustrated embodiment, the vehicle 105a has a total capacity of 4,013 pounds and 42,660 cubic feet of which 4,013 pounds and 42,660 cubic feet are currently available. The vehicle 105c has a total capacity of 2,878 pounds and 36,280 cubic feet. The capacity of the vehicle 105c is refrigerated capacity. However, none of that capacity is currently available (e.g., the container associated with the vehicle 105c is full) since the available capacity is indicated as 0 pounds and 0 cubic feet.

Figure 3:
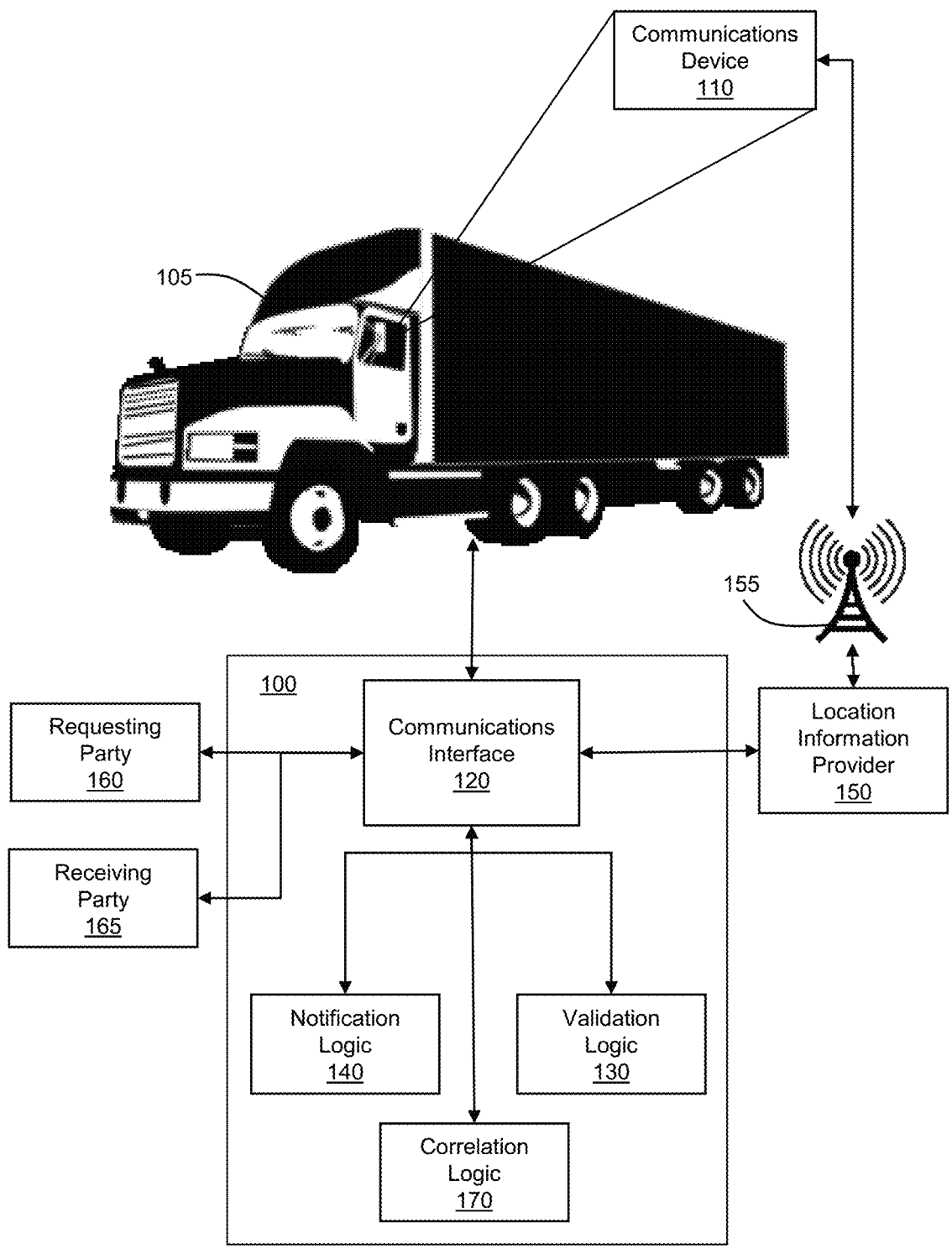
FIG. 3 illustrates the exemplary system for monitoring the location of a vehicle with additional details.

FIG. 3 illustrates the exemplary system 100 for monitoring the location of a vehicle 105 with additional details.

As described above, the system 100 receives the location information of the device 110 from a location information provider 150, which is a party or device other than the device 110. The location information provider 150 may be a wireless service provider or a party or device that receives the location information from a wireless service provider. Examples of wireless service providers in the United States include Verizon Wireless, AT&T Mobility, Sprint Nextel, T-Mobile, etc. These wireless service providers have technologies deployed that allow them to approximate the location of devices in their network. Some of these technologies were developed and deployed in compliance with E911, a government mandate requiring the wireless service providers to provide the approximate location of a mobile device in case of an emergency.

Location of devices in a cellular network may be described as involving two general positioning techniques: 1) techniques that require the device to incorporate a global positioning system (GPS) receiver, and 2) techniques that use some form of radiolocation from the device's network and do not require the device to incorporate a GPS receiver.

In one embodiment, the wireless service provider or another party or device originally obtaining or deriving the location information of the device 110 derives the location information of the device 110 at least in part by using a radiolocation technique where the approximated location of the device 110 corresponds to a range of locations corresponding to a transmission range of a single radio tower 155. In an example of this technology, each radio tower is assigned a unique identification number, a Cell-ID. The Cell-ID is received by all mobile devices in the coverage area of the radio tower 155, thus the position of the device 110 in the coverage area of the radio tower 155 is derived from the coordinates of the radio tower 155. Additional techniques, such as measuring signal strength of the device 110 could be used to increase the accuracy of the location information. Accuracy can be further enhanced by including a measurement of Timing Advance (TA) in GSM/GPRS networks or Round Trip Time (RTT) in UMTS networks. TA and RTT use time offset information sent from the radio tower 155 to adjust the communications device's relative transmit time to correctly align the time at which the communications device's signal arrives at the radio tower 155. These measurements can be used to determine the distance from the communications device to the radio tower 155, further improving accuracy.

In one embodiment, the wireless service provider or another party or device originally obtaining or deriving the location information of the device 110 derives the location information of the device 110 at least in part using triangulation between multiple radio towers such as tower 155. The location of the device 110 may be determined by using one or a combination of several techniques including the following:

Angle of Arrival (AOA)—This technique requires at least two radio towers and locates the device 110 at the point where the lines along the angles from each tower intersect.

Time Difference of Arrival (TDOA)—This technique also requires at least two radio towers and determines the time difference between the time of arrival of a signal from the device 110 to the first tower 155, to a second tower, and so on.

Advanced Forward Link Trilateration (AFLT)—In this technique the communications device measures signals from nearby towers such as radio tower 155, which are then used to triangulate an approximate location of the device 110.

Enhanced-observed time difference (E-OTD)—This technique takes data received from the nearby towers such as radio tower 155 to measure the difference in time it takes for the data to reach the device 110. The time difference is used to calculate where the device 110 is in relation to the radio towers.

In one embodiment, the wireless service provider or another party or device originally obtaining or deriving the location information of the device 110 derives the location information of the device 110 at least in part by using a method including a technique not requiring a GPS satellite receiver to form part of the device 110. In another embodiment the wireless service provider or another party or device deriving the location information of the device 110 derives the location information of the device 110 at least in part by using a hybrid method including a technique requiring a GPS satellite receiver to form part of the device 110 and a technique not requiring a GPS satellite receiver to form part of the device 110. In yet another embodiment, the wireless service provider or another party or device deriving the location information of the device 110 derives the location information of the device 110 at least in part by using a method including a technique requiring a GPS satellite receiver to form part of the device 110.

However, since the system 100 obtains the location information from the location information provider 150 and not from the device 110, the system 100 can be operated to monitor the location of devices incorporating a GPS satellite receiver as well as devices not incorporating a GPS satellite receiver. Thus, the system 100 does not rely on any particular positioning technology for obtaining the location of the vehicle 105.

In continued reference to FIG. 3, the system 100 provides user notification and receives user consent to the monitoring the location of the vehicle 105. In this embodiment, the communications interface 120 is further configured for communication with the device 110. In one embodiment, the communication interface 120 is associated with a toll free number such as a 1-800 number. The driver of the vehicle 105 may initiate a telephone call by dialing the toll free number. In another embodiment, the communications interface is associated with a number other than a toll free number. In yet another embodiment, the communications interface 120 is configured to initiate the telephone call.

In one embodiment, the system 100 further includes a validation logic 130 that is configured to identify the device 110 at least in part by obtaining the identifier associated with the device 110. Obtaining the identifier associated with the device 110 ensures that the correct party (e.g., the driver of the vehicle 105 or the user associated with the device 110) is notified that location of the vehicle 105 will be monitored and that the correct party (e.g., the driver of the vehicle 105 or the user associated with the device 110) consents to the monitoring of the location. In one embodiment, the identifier is a telephone number associated with the device 110. In one embodiment, where the communications interface 120 is associated with a toll free number as discussed above, the validation logic 130 is configured to identify the device 110 at least in part by obtaining the telephone number associated with the device 110 via automatic number identification (ANI). As discussed above in reference to FIG. 2, in other embodiments, the identifier may be an identifier other than a telephone number.

The system 100 further includes a notification logic 140 that is configured to communicate a signal including data representing an automated voice message. In one embodiment, the automated voice message provides a notice that includes information indicating that consenting to the monitoring of the location of the vehicle 105 would result in the location of the vehicle 105 or the device 110 being disclosed. In another embodiment, the automated voice message provides a location (web address, etc.) where the notice may be found indicating that consenting to the monitoring of the location of the vehicle 105 would result in the location of the vehicle 105 or the device 110 being disclosed. For example, the automated voice message may indicate that the notice may be found at a web address and provide the web address.

The communications interface 120 is configured to transmit the automated voice message to the device 110. The communications interface 120 is further configured to receive from the device 110 data indicating the user consent to monitoring of the location of the vehicle 105.

In one embodiment, the automated voice message communicates that user's consent to the monitoring of the location of the vehicle 105 may be indicated by performing an action on the communications device (e.g., "to indicate your consent to revealing your location, please press 1.") In this embodiment, the communications interface 120 is configured to receive data indicating that an action was performed on the device 110, which indicates the user's consent (e.g., the user pressed 1).

In another embodiment, the automated voice message communicates that the user's consent to the monitoring of the location of the vehicle 105 may be indicated by speaking a particular word or phrase to be received by the device 110 (e.g., "to indicate your consent to revealing your location, please say 'yes.") In this embodiment, the communications interface 120 is configured to receive a voice command from the device 110, which indicates the user's consent (e.g., the user said "yes").

In one embodiment, after receiving the user consent to the monitoring of the location of the device 105, the communications interface 120 transmits a request for the location information of the device 110 and receives the location information of the communications device 110. The request for the location information of the device 110 includes the identifier associated with the device 110.

In the illustrated embodiment, after receiving the user consent to the monitoring of the location of the device 105, the communications interface 120 transmits a request for the location information of the device 110 to a location information provider 150 and receives the location information of the communications device 110 from the location information provider 150.

In one embodiment, the notification logic 140 is further configured to communicate a signal including data representing a second automated voice message indicating that consent to the monitoring of the location of the vehicle 105 is revocable via the device 110. In this embodiment, the communications interface 120 is configured to communicate to the device 110 the second automated voice message and to receive confirmation of consent or revocation of consent to the monitoring of the location of the vehicle 105 from the device 110.

In one embodiment, the second automated voice message communicates that the user's confirmation of consent or the user's revocation of consent to the monitoring of the location of the vehicle 105 may be indicated by performing an action on the communications device (e.g., "to indicate that you wish to revoke consent to revealing your location, please press 1.") In this embodiment, the communications interface 120 is configured to receive data indicating that an action was performed on the device 110, which indicates the user's confirmation or revocation of consent (e.g., the user pressed 1).

In another embodiment, the second automated voice message communicates that the user's confirmation of consent or the user's revocation of consent to the monitoring of the location of the vehicle 105 may be indicated by speaking a particular word or phrase to be received by the device 110 (e.g., "to indicate your confirmation of consent to revealing your location, please say 'confirmed.") In this embodiment, the communications interface 120 is configured to receive a voice command from the device 110, which indicates the user's confirmation or revocation of consent (e.g., the user said "confirmed").

In one embodiment, the user is given the option to temporarily revoke consent to the disclosure of location information. For example, a driver may wish to make available his location to a carrier during certain hours during the work week, but may not want the carrier to be able to obtain the driver's location during the weekend. The driver may operate the device 110 to indicate a date and time when the driver wishes for the monitoring of the location of the vehicle 105 to end or resume. Or the driver may operate the device 110 to indicate an interval of time (e.g., 2 hours) during which the driver wishes to hide the location of the vehicle 105. In this embodiment, the communications interface 120 is configured to receive data indicating a time until which consent to the monitoring of the location of the vehicle 105 is granted or revoked, or an interval of time during which consent to the monitoring of the location of the vehicle 105 is granted or revoked.

In one embodiment, the user is given the option to temporarily revoke consent to the monitoring of the location of the vehicle 105 by texting (e.g., SMS message) the term "hide" using the device 110. In one embodiment, the user is given the option to indicate consent to the monitoring of the location of the vehicle 105 by texting (e.g., SMS message) the term "share" using the device 110. In this embodiment, the communications interface 120 is configured to receive the text message as sent by the device 110, which indicates the user's confirmation or revocation of consent. In another embodiment, the user may speak the terms "hide" or "share" to temporarily revoke consent or to indicate consent to the monitoring of the location of the vehicle 105, respectively. In this embodiment, the communications interface 120 is configured to receive a voice command from the device 110, which indicates the user's confirmation or revocation of consent.

In one embodiment, when the location of the vehicle 105 is being disclosed, the notification logic 140 is further configured to periodically generate and the communications interface 120 is further configured to periodically communicate a reminder notification message indicating that the location of the vehicle 105 is currently being disclosed. In one embodiment, the system 100 reminds the user every 30 days that the location of the vehicle 105 is currently being disclosed. In another embodiment, the system 100 reminds the user more or less often than every 30 days that the location of the vehicle 105 is currently being disclosed.

In one embodiment, the communications interface 120 reminds the user in an automated voice message that the location of the vehicle 105 is currently being disclosed. In another embodiment, the communications interface 120 reminds the user in an SMS message that the location of the vehicle 105 is currently being disclosed. In yet another embodiment, the communications interface 120 reminds the user via electronic communication other than an automated voice message or an SMS message that the location of the vehicle 105 is currently being disclosed.

Example methods may be better appreciated with reference to the flow diagrams of FIGS. 4 through 7. While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown or described. Moreover, less than all the illustrated blocks may be required to implement an example methodology. Furthermore, additional or alternative methodologies can employ additional, not illustrated blocks.

In the flow diagrams, blocks denote "processing blocks" that may be implemented with logic. The processing blocks may represent a method step or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

In one example, methodologies are implemented as processor executable instructions or operations provided on a computer-readable medium. Thus, in one example, a computer-readable medium may store processor executable instructions operable to perform the methods of FIGS. 4 through 7.

While FIGS. 4 through 7 illustrate various actions occurring in serial, it is to be appreciated that various actions illustrated in FIGS. 4 through 7 could occur substantially in parallel. While a number of processes are described, it is to be appreciated that a greater or lesser number of processes could be employed and that lightweight processes, regular processes, threads, and other approaches could be employed. It is to be appreciated that other example methods may, in some cases, also include actions that occur substantially in parallel.

Figure 4:
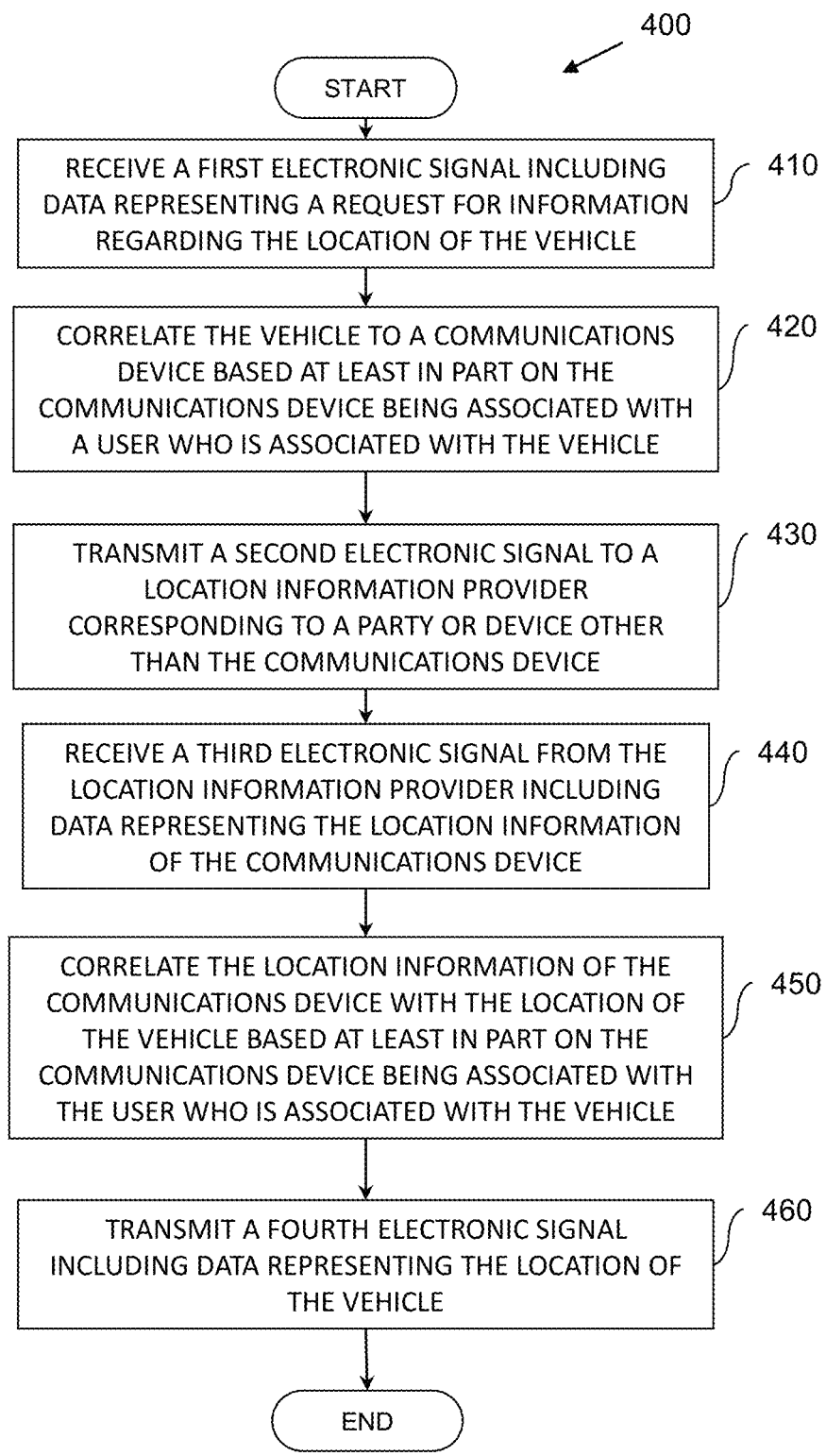
FIG. 4 illustrates a flow diagram for an exemplary method for monitoring location of a vehicle.

FIG. 4 illustrates a flow diagram for an exemplary method 400 for monitoring location of a vehicle. At 410, the method 400 includes receiving a first electronic signal including data representing a request for information regarding the location of the vehicle. At 420, the method 400 includes correlating the vehicle to a communications device based at least in part on the communications device being associated with a user who is associated with the vehicle. At 430, the method 400 includes transmitting a second electronic signal to a location information provider corresponding to a party or device other than the communications device. The second electronic signal includes data representing a request for location information of the communications device. In one embodiment, the second electronic signal includes data representing a telephone number associated with the communications device.

At 440, the method 400 includes receiving a third electronic signal from the location information provider including data representing the location information of the communications device. At 450, the method 400 includes correlating the location information of the communications device with the location of the vehicle based at least in part on the communications device being associated with the user who is associated with the vehicle. At 460, the method 400 includes transmitting a fourth electronic signal including data representing the location of the vehicle. In one embodiment, the transmitting the fourth electronic signal including data representing the location of the vehicle includes exposing an application programming interface (API) from which the requesting party can access the location of the vehicle.

In one embodiment, the location information of the communications device is originally obtained using a method including a technique other than a technique utilizing a global position system (GPS) satellite receiver that forms part of the communications device. In one embodiment, the location information of the communications device is originally obtained using a method including at least one of: advance forward link trilateration (AFLT), observed time difference (OTD), Cell-ID (CID), and obtaining a range of locations corresponding to a transmission range of a single radio tower.

In one embodiment, the user of the communications device is a driver of the vehicle. In one embodiment, the location information provider corresponds to one of: a wireless service provider providing wireless service to the communications device or a third party that obtains the location information from the wireless service provider providing wireless service to the communications device. In one embodiment, the requesting party corresponds to one of: a freight service provider wherein the location of the vehicle is transmitted to the freight service provider for the freight service provider to have access to location of freight carried by the vehicle, or the driver of the vehicle requesting that the location of the vehicle be transmitted to a freight service provider for the freight service provider to have access to location of freight carried by the vehicle.

Figure 5:
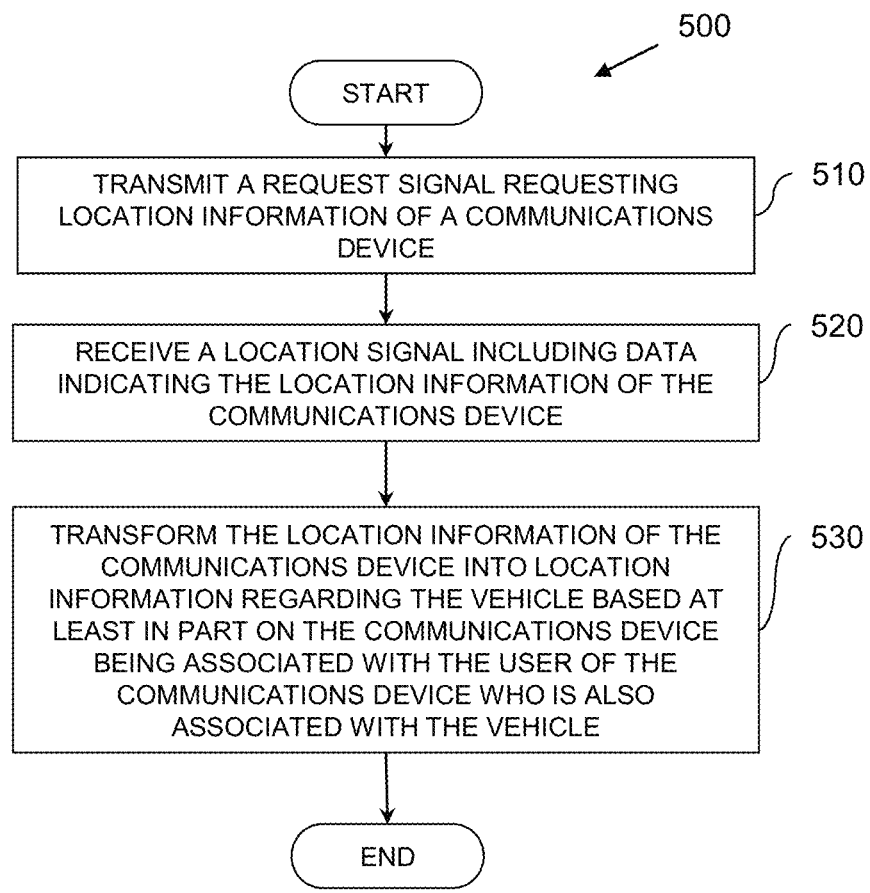
FIG. 5 illustrates a flow diagram for an exemplary method for monitoring location of a vehicle.

FIG. 5 illustrates a flow diagram for an exemplary method 500 for monitoring location of a vehicle. At 510, the method 500 includes transmitting a request signal requesting location information of a communications device. The request signal is transmitted to a party other than the communications device. The communications device is associated with a user of the communications device who is also associated with the vehicle. At 520, the method 500 includes receiving a location signal including data indicating the location information of the communications device. The location signal is received from a party other than the communications device.

At 530, the method 500 includes transforming the location information of the communications device into location information regarding the vehicle based at least in part on the communications device being associated with the user of the communications device who is also associated with the vehicle.

In one embodiment, the location information of the communications device is originally obtained by a wireless service provider providing wireless service to the communications device. In one embodiment, the location information of the communications device includes location information obtained in compliance with E911. In one embodiment, the location information of the communications device is originally obtained using a method not requiring a global position system (GPS) satellite receiver to form part of the communications device. In one embodiment, the location information of the communications device is originally obtained through triangulation between radio towers. In one embodiment, the location information of the communications device is originally obtained using a range of locations corresponding to a transmission range of a single radio tower.

In one embodiment, the location signal is received from one of: a wireless service provider, or a third party who receives the location information from the wireless service provider.

Figure 6:
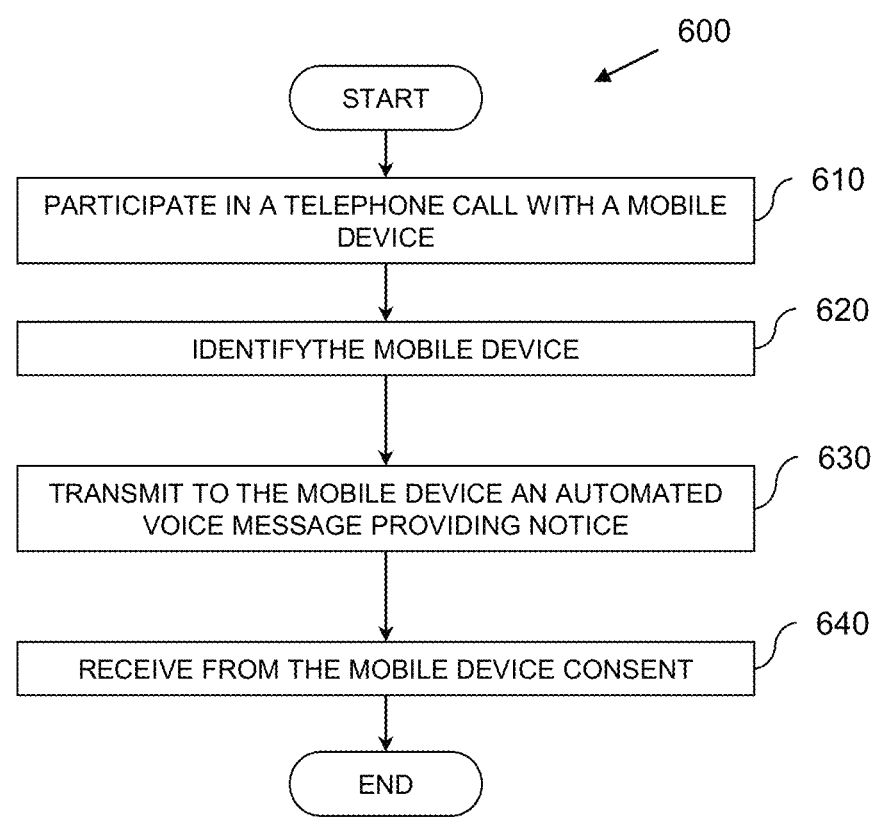
FIG. 6 illustrates a flow diagram for an exemplary method for receiving consent from a user to monitoring the location of a vehicle associated with the user.

FIG. 6 illustrates a flow diagram for an exemplary method 600 for receiving consent from a user for monitoring the location of a vehicle associated with the user. At 610, the method 600 includes participating in a telephone call with a communications device associated with the user. In one embodiment, the user of the communications device initiates the telephone call. In another embodiment, the user of the communications device receives the telephone call. At 620, the method 600 includes identifying the communications device at least in part by obtaining an identifier associated with the communications device. In one embodiment, the identifier is a telephone number associated with the communications device. In one embodiment, the communications device user places the telephone call to a toll free number and the identifying the communications device includes obtaining a telephone number associated with the communications device via automatic number identification (ANI).

In other embodiments, the identifier is an identifier other than a telephone number. For example, the identifier may be a mobile identification number (MIN), an electronic serial number (ESN), an International Mobile Equipment Identity (IMEI), an International Mobile Subscriber Identity (IMSI), a Mobile Equipment Identifier (MEID), a Manufacturer's Serial Number (MSN), a Mobile Subscriber Integrated Services Digital Network (MSISDN) number, a Media Access Control (MAC) address, combinations thereof, and so on.

At 630, the method 600 includes transmitting to the communications device a signal including data representing an automated voice message. The automated voice message communicates to the user of the communications device at least one of: (a) a notice including information indicating that consenting to the monitoring of the location of the vehicle would result in the location of the vehicle or the location of the communications device being disclosed, or (b) a location at which to find the notice. At 640, the method 600 includes receiving from the user via the communications device consent for monitoring the location of the vehicle.

In one embodiment, the receiving from the communications device consent for monitoring the location of the vehicle includes receiving data indicating that the user has performed an action on the communications device. For example, the user may have pressed a key in the communications device, touched or swipe a particular portion of the device's screen, shaken the communications device, combinations thereon and so on. In another embodiment, the receiving from the communications device consent for monitoring the location of the vehicle includes receiving a voice command from the communications device.

In one embodiment, once consent has been obtained from the user of the communications device, the method 600 includes periodically communicating to the user via the communications device a notification message indicating that the location is being disclosed.

In one embodiment, after receiving from the user consent for monitoring the location of the vehicle, the method 600 includes transmitting a request for the location information of the communications device and receiving the location information of the communications device.

In one embodiment, after receiving the location information of the communications device, the method 600 includes communicating the location of the vehicle to a receiving party. In one embodiment, communicating the location of the vehicle to a receiving party includes: (a) transmitting the communicating the location of the vehicle to the receiving party through computer communication, or (b) exposing an application programming interface (API) from which the receiving party can access the location of the vehicle.

Figure 7:
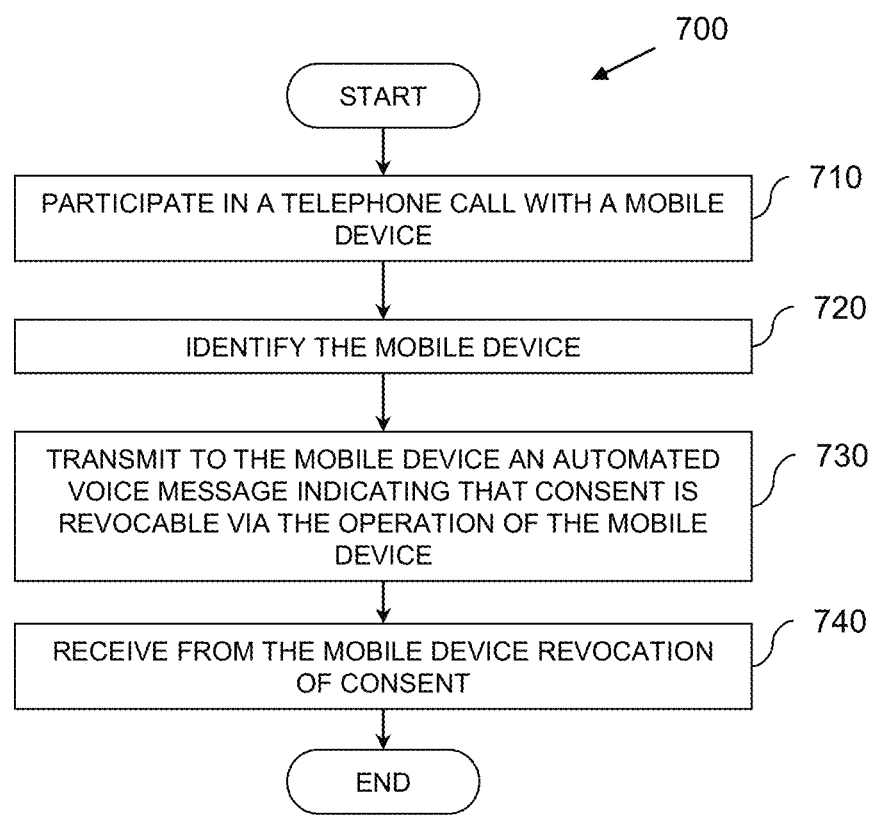
FIG. 7 illustrates a flow diagram for an exemplary method for receiving from a user a revocation of consent to monitoring the location of a vehicle associated with the user.

FIG. 7 illustrates a flow diagram for an exemplary method 700 for receiving from a user a revocation of consent for monitoring the location of a vehicle associated with the user. At 710, the method 700 includes participating in a telephone call with a communications device associated with the user. In one embodiment, the user initiates the telephone call. In another embodiment, the user receives the telephone call. At 720, the method 700 includes identifying the communications device at least in part by obtaining an identifier associated with the communications device. In one embodiment, the identifier is a telephone number associated with the communications device. In one embodiment, the user places the telephone call to a toll free number and the identifying the communications device includes obtaining a telephone number associated with the communications device via automatic number identification (ANI). In other embodiments, the identifier is an identifier other than a telephone number as discussed above in reference to method 600.

At 730, the method 700 includes communicating to the user via an automated voice message transmitted to the communications device information indicating that consent to the monitoring of the location of the vehicle associated with the user is revocable via the communications device. At 740, the method 700 includes receiving from the communications device revocation of the consent to the monitoring of the location of the vehicle associated with the user.

In one embodiment, the receiving from the communications device revocation of consent to the monitoring of the location of the vehicle includes receiving data indicating that the user has performed an action on the communications device. For example, the user may have pressed a key in the communications device, touched or swipe a particular portion of the device's screen, shaken the communications device, combinations thereon and so on. In another embodiment, the receiving from the communications device revocation of consent to the monitoring of the location of the vehicle includes receiving a voice command from the communications device.

In one embodiment, the revocation of consent is temporary, and the receiving from the communications device revocation of the consent to the monitoring of the location of the vehicle includes receiving data indicating (a) a time at which consent to the monitoring of the location of the vehicle is revoked, (b) a time until which the consent to the monitoring of the location of the vehicle is revoked, or (c) an interval of time during which the consent to the monitoring of the location of the vehicle is revoked. Consent is revoked at the time indicated or at the beginning of the indicated interval of time. Consent is unrevoked at the indicated time until which the consent to the monitoring of the location of the vehicle is revoked or upon expiration of the indicated interval of time during which the consent to the monitoring of the location of the vehicle is revoked.

In one embodiment, the user is given the option to temporarily revoke consent to the monitoring of the location of the vehicle by texting (e.g., SMS message) the term "hide" using the device 110. In one embodiment, the user is given the option to indicate consent to the monitoring of the location of the vehicle by texting (e.g., SMS message) the term "share" using the device 110. In another embodiment, the user may speak the terms "hide" or "share" to temporarily revoke consent or to indicate consent to the monitoring of the location of the vehicle, respectively. In one embodiment, words other than "hide" or "share" may be used to temporarily revoke consent or to indicate consent to the monitoring of the location of the vehicle, respectively.

Figure 8:
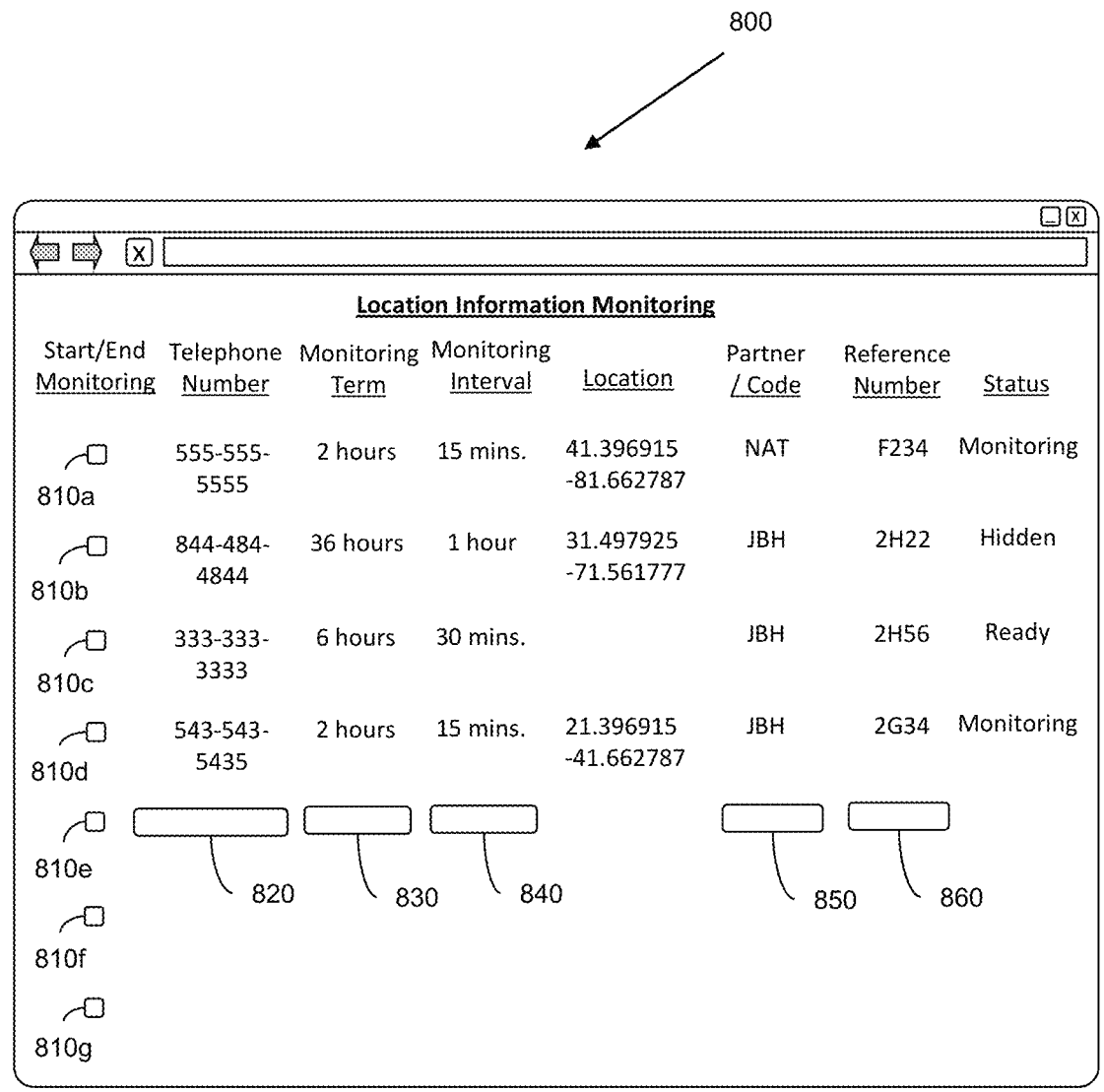
FIG. 8 illustrates an exemplary user interface for use in conjunction with a system for monitoring the location of a vehicle.

FIG. 8 illustrates an exemplary user interface 800 for use in conjunction with a system for monitoring of the location of the vehicle. The user interface 800 is operable by the requesting party or the receiving party to set up monitoring of the location of the vehicle, display information regarding monitoring of the location of the vehicle, and display location of the vehicle.

In the illustrated embodiment, the user interface 800 displays Start/End Monitoring buttons 810a-g operable by a user to end or start monitoring of the location of the vehicle. The user interface 800 further displays the Telephone Number corresponding to the communications device associated with a user associated with the vehicle. The user interface 800 further displays the Monitoring Term, which corresponds to the total amount of time (e.g., 2 hours) that the location of the associated vehicle will be monitored. The user interface 800 further displays the Monitoring Interval, which corresponds to how often within the Monitoring Term (e.g., every 15 minutes) the location of the vehicle is updated. In the illustrated embodiment, the user interface 800 displays the Location as latitude and longitude coordinates. In another embodiment, the user interface 800 displays the Location in a format other than latitude and longitude coordinates. In one embodiment, a user may click on Location to display a map that includes a mark indicating the location of the vehicle on the map.

In one embodiment, an operator of a system for monitoring location of a vehicle or some other party who provides vehicle location monitoring services to a user charges fees to the user on a per-load basis or a per-time-monitored basis. A common practice in the vehicle location monitoring services industry is to charge a user a standard flat monthly fee for monitoring services. This is, at least in part, due to limitations of conventional systems for monitoring vehicle location. The systems and methods for monitoring location of a vehicle disclosed herein provide the provider of vehicle location monitoring services with the ability to charge for the services on a per-load basis or a per-time-monitored basis. For example, a user may operate the user interface 800 or any other means to interface with the system for monitoring location of vehicles to set a time to start or end monitoring of the location of five vehicles (e.g., Start/End Monitoring buttons 810a-g).

In one embodiment where the provider of vehicle location monitoring services provides its services on a per-load or a per-time-monitored basis at a set or negotiated rate per load per unit time, the system may keep track of the number of vehicles (i.e., five) whose location is monitored, as well as the total amount of time for which vehicles' location is monitored (i.e., total time×5 vehicles× rate). The operator may use the Monitoring Term to establish the total amount of time (e.g., 2 hours) or the Monitoring Interval to establish the frequency within the Monitoring Term (e.g., every 15 minutes) that the location of the vehicle or vehicles is monitored. With this information available to the operator's billing system, the operator can charge fees to the user on a per-load basis or a per-time-monitored basis.

In the illustrated embodiment, the user interface displays a Partner/Code. The Partner/Code field may display a code corresponding to a partner company or driver. For example, a carrier A may subcontract with another carrier NAT to move freight from location 1 to location 2. The user interface displays the carrier NAT associated with the Telephone Number 555-555-5555.

The user interface 800 further displays a Reference Number. In one embodiment, the Reference Number field is a customizable field that carriers can use to identify a particular load, a particular vehicle, a particular order, etc. In one embodiment, the Reference Number appears in invoices and other documents to facilitate efficient system administration.

The user interface 800 further displays the Status of the vehicle. For example, the Status may indicate that the system is Monitoring the vehicle. In another example, the Status may display that the vehicle is Hidden to indicate that the user associated with the vehicle has temporarily revoked consent to monitoring of the vehicle's location. Other possible Status indicators include: (a) Ready to monitor, which indicates that the monitoring of the location of the vehicle is setup and the system is awaiting location information data, (b) Expired, which indicates that the Monitoring Term has expired, and (c) Denied, which indicates that the user denied consent to monitoring the location of the vehicle.

In one embodiment, the user interface 800 is used to add vehicles whose location is to be monitored. A user may use field 820 to enter the identifier corresponding to the communications device associated with the vehicle whose location is to be monitored. In one embodiment (not illustrated), the user interface 800 provides a pull-down menu from which the user may chose an identifier. The user may further enter the Monitoring Term in field 830, the Monitoring Interval in field 840, the Partner/Code in field 850 and the Reference Number in field 860. In one embodiment (not illustrated), the user interface 800 provides each of these fields as pull-down menus.

In some cases, the requesting party may not know the identifier corresponding to the vehicle or the user may know the identifier but not have authorization to monitoring the location of the vehicle associated with the identifier. In one embodiment (not shown), the user may enter a Partner/Code that serves as verification that the user has obtained authorization from the partner to monitor location of the vehicle associated with the identifier. This feature may also serve to keep the user from learning the identifier in cases where the user associated with the vehicle, the partner, or some other party desires not to reveal the identifier to the requesting party.

In one embodiment, the user associated with the vehicle (e.g., driver) may enter the Partner/Code. For example, the user associated with the vehicle may be an independent driver who wishes for the location information of his vehicle to be monitored by a carrier so that the carrier may assign freight for the driver to haul. However, the carrier may not want every driver in the field to do this freely because of the potential costs associated with monitoring the location of a large number of vehicles. The carrier may require the driver to enter a Partner/Code obtained from the carrier that serves as verification that the driver has obtained authorization from the carrier for the location of the driver's vehicle to be monitored by the carrier.

Figure 9:
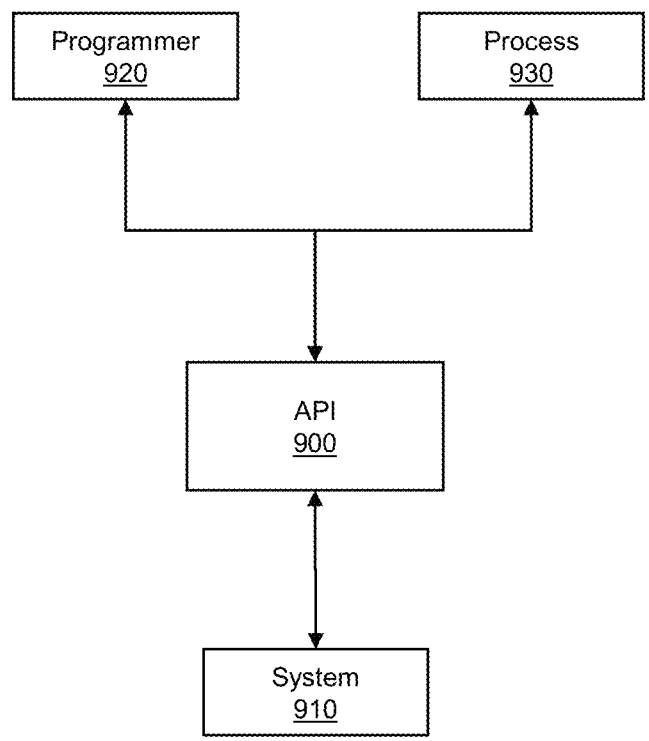
FIG. 9 illustrates an application programming interface (API) providing access to a system for monitoring the location of a vehicle.

Referring now to FIG. 9, an application programming interface (API) 900 is illustrated providing access to a system 910 for monitoring location of a vehicle to a receiving party. The API 900 can be employed, for example, by a programmer 920 or a process 930 to gain access to processing performed by the system 910. For example, a programmer 920 can write a program to access the system 910 (e.g., invoke its operation, obtain its operation, set up its operation, monitor location of a vehicle) where writing the program is facilitated by the presence of the API 900. Rather than programmer 920 having to understand the internals of the system 910, the programmer 920 merely has to learn the interface to the system 910. This facilitates encapsulating the functionality of the system 910 while exposing that functionality.

Similarly, the API 900 can be employed to provide data values to the system 910 or retrieve data values from the system 910. For example, a process 930 that processes location of a vehicle can provide an identifier to the system 910 via the API 900 by, for example, using a call provided in the API 900. Thus, in one example of the API 900, a set of application programming interfaces can be stored on a computer-readable medium. The interfaces can be employed by a programmer, computer component, logic, and so on, to gain access to a system 910 for monitoring location of a vehicle.

Figure 10:
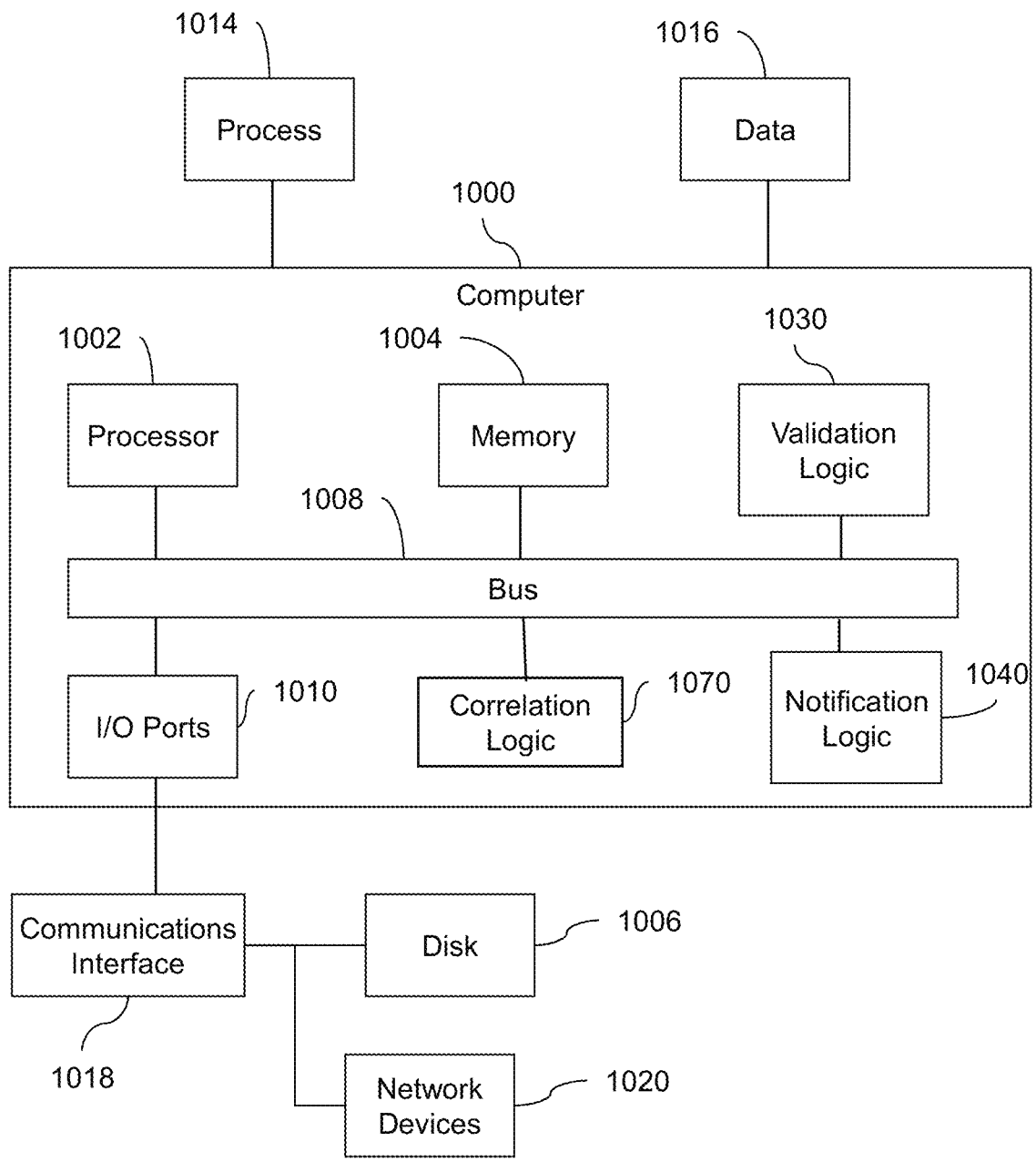
FIG. 10 illustrates a computer where systems or methods for monitoring the location of a vehicle may be implemented.

FIG. 10 illustrates a computer 1000 that includes a processor 1002, a memory 1004, and I/O Ports 1010 operably connected by a bus 1008. In one example, the computer 1000 may include a validation logic 1030 configured to facilitate validation of a communications device. Thus, the validation logic 1030, whether implemented in computer 1000 as hardware, firmware, software, or a combination thereof may provide means for identifying the communications device at least in part by obtaining an identifier associated with the communications device. In another example, the computer 1000 may include a notification logic 1040 configured to provide notification to the user associated with a vehicle. Thus, the notification logic 1040, whether implemented in computer 1000 as hardware, firmware, software, or a combination thereof may provide means for communicating a signal including data representing automated voice messages that provide notices or directs the user of the communications device to notices that include information indicating (a) that consenting to the monitoring of the vehicle will result in the location information of the vehicle or the communications device being disclosed, (b) that the user may revoke notice by operation of the communications device, and so on. In yet another example, the computer 1000 may include a correlation logic 1070 configured to correlate a vehicle to a communications device or the location information of a communications device to the location of a vehicle based at least in part on the communications device being associated with a user of the communications device who is associated with the vehicle. Thus, the correlation logic 1070, whether implemented in computer 1000 as hardware, firmware, software, or a combination thereof may provide means for correlating a vehicle to a communications device based at least in part on the communications device being associated with the user who is associated with the vehicle, means for correlating the location information of the communications device with the location of the vehicle based at least in part on the communications device being associated with the user who is associated with the vehicle, or means for transforming the location information of the communications device into location information regarding the vehicle based at least in part on the communications device being associated with the user of the communications device who is also associated with the vehicle. The validation logic 1030, the notification logic 1040, or the correlation logic 1070 may be permanently or removably attached to the computer 1000.

The processor 1002 can be a variety of various processors including dual microprocessor and other multi-processor architectures. The memory 1004 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 1006 may be operably connected to the computer 1000 via, for example, a communications interface (e.g., card, device) 1018 and an I/O Ports 1010. The disk 1006 can include, but is not limited to, devices like a magnetic disk drive, a solid state disk drive, a floppy disk drive, a tape drive, a Zip drive, a flash memory card, or a memory stick. Furthermore, the disk 1006 can include optical drives like a CD-ROM, a CD recordable drive (CD-R drive), a CD rewriteable drive (CD-RW drive), or a digital video ROM drive (DVD ROM). The memory 1004 can store processes 1014 or data 1016, for example. The disk 1006 or memory 1004 can store an operating system that controls and allocates resources of the computer 1000.

The bus 1008 can be a single internal bus interconnect architecture or other bus or mesh architectures. While a single bus is illustrated, it is to be appreciated that computer 1000 may communicate with various devices, logics, and peripherals using other busses that are not illustrated (e.g., PCIE, SATA, Infiniband, 1394, USB, Ethernet). The bus 1008 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The computer 1000 may interact with input/output devices via communications interface 1018 and I/O Ports 1010. Input/output devices can include, but are not limited to, a keyboard, a microphone, a pointing and selection device, cameras, video cards, displays, disk 1006, network devices 1020, and the like. The I/O Ports 1010 can include but are not limited to, serial ports, parallel ports, and USB ports.

The computer 1000 can operate in a network environment and thus may be connected to network devices 1020 via the communications interface 1018, or the I/O Ports 1010. Through the network devices 1020, the computer 1000 may interact with a network. Through the network, the computer 1000 may be logically connected to remote computers. The networks with which the computer 1000 may interact include, but are not limited to, a local area network (LAN), a wide area network (WAN), and other networks. The network devices 1020 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 1020 can connect to WAN technologies including, but not limited to, point to point links, circuit switching networks like integrated services digital networks (ISDN), packet switching networks, LTE networks, GSM networks, GPRS networks, CDMA networks, and digital subscriber lines (DSL). While individual network types are described, it is to be appreciated that communications via, over, or through a network may include combinations and mixtures of communications.

DEFINITIONS

The following includes definitions of selected terms employed herein. The definitions include various examples, forms, or both of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process or thread of execution and a computer component can be localized on one computer or distributed between two or more computers.

"Computer communication," as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11, IEEE 802.15), an Ethernet system (e.g., IEEE 802.3), a token ring system (e.g., IEEE 802.5), a local area network (LAN), a wide area network (WAN), a point-to-point system, a circuit switching system, a packet switching system, combinations thereof, and so on.

"Computer-readable medium," as used herein, refers to a medium that participates in directly or indirectly providing signals, instructions or data. A computer-readable medium may take forms, including, but not limited to, non-volatile media, volatile media, and transmission media. Non-volatile media may include, for example, optical or magnetic disks, and so on. Volatile media may include, for example, optical or magnetic disks, dynamic memory and the like. Transmission media may include coaxial cables, copper wire, fiber optic cables, and the like. Transmission media can also take the form of electromagnetic radiation, like that generated during radio-wave and infra-red data communications, or take the form of one or more groups of signals. Common forms of a computer-readable medium include, but are not limited to, a floppy disk, a flexible disk, a hard disk, a magnetic tape, other magnetic media, a CD-ROM, other optical media, punch cards, paper tape, other physical media with patterns of holes, a RAM, a ROM, an EPROM, a FLASH-EPROM, or other memory chip or card, a memory stick, a carrier wave/pulse, and other media from which a computer, a processor or other electronic device can read. Signals used to propagate instructions or other software over a network, like the Internet, can be considered a "computer-readable medium."

"Data store," as used herein, refers to a physical or logical entity that can store data. A data store may be, for example, a database, a table, a file, a list, a queue, a heap, a memory, a register, and so on. A data store may reside in one logical or physical entity or may be distributed between two or more logical or physical entities.

A "logic," as used herein, includes but is not limited to hardware, firmware, software or combinations of each to perform a function(s) or an action(s), or to cause a function or action from another logic, method, or system. For example, based on a desired application or needs, a logic may include a software controlled microprocessor, discrete logic like an application specific integrated circuit (ASIC), a programmed logic device, a memory device containing instructions, or the like. A logic may include one or more gates, combinations of gates, or other circuit components. A logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

"Signal," as used herein, includes but is not limited to one or more electrical or optical signals, analog or digital signals, data, one or more computer or processor instructions, messages, a bit or bit stream, or other means that can be received, transmitted or detected.

"Software," as used herein, includes but is not limited to, one or more computer or processor instructions that can be read, interpreted, compiled, or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servelet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or executable instructions can be located in one logic or distributed between two or more communicating, co-operating, or parallel processing logics and thus can be loaded or executed in serial, parallel, massively parallel and other manners.

Suitable software for implementing the various components of the example systems and methods described herein may be produced using programming languages and tools like Java, Java Script, Java.NET, ASP.NET, VB.NET, Cocoa, Pascal, C#, C++, C, CGI, Perl, SQL, APIs, SDKs, assembly, firmware, microcode, or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User," as used herein, includes but is not limited to one or more persons, software, computers or other devices, or combinations of these.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, and illustrative examples shown or described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

The invention claimed is:

1. A system for obtaining location of a vehicle or freight carried by the vehicle, the system comprising:
   a mobile device comprising a GPS receiver, a display, a microprocessor and a wireless communication transceiver coupled to the GPS receiver, the mobile device programmed to receive data sent by a plurality of GPS satellites, calculate location information of the mobile device comprising the GPS receiver and transmit the location information;
   a server comprising a central processing unit, a memory, a clock, and a server communication transceiver that receives the location information of the mobile device comprising the GPS receiver, and the central processing unit programmed to:
   receive a request for the location of the vehicle or the freight carried by the vehicle,
   request the location information of the mobile device comprising the GPS receiver from a location information provider corresponding to a device other than the mobile device and associated with one or more of:
      a wireless service provider providing wireless service to the mobile device,
      a third party obtaining the location information from the wireless service provider providing wireless service to the mobile device, and
      a party that has access to the location information, but is other than the wireless service provider or the third party that obtains the location information from the mobile service provider; and
   receive the location information of the mobile device comprising the GPS receiver from the location information provider corresponding to the device other than the mobile device;
   estimate the location of the vehicle or the freight carried by the vehicle based on the location information of the mobile device comprising the GPS receiver; and
   transmit the location of the vehicle or the freight carried by the vehicle as estimated based on the estimation for visual representation on a display,
   wherein the central processing unit is further programmed to:
   receive data that indicates consent to transmission of the location information of the vehicle or the freight carried by the vehicle.

2. The system of claim 1, wherein the location information of the mobile device comprising the GPS receiver is originally obtained using a technique utilizing the GPS receiver that forms part of the mobile device.

3. The system of claim 1, wherein the location information of the mobile device comprising the GPS receiver is originally obtained using a method that does not require a GPS receiver to form part of the mobile device.

4. The system of claim 1, wherein the location information of the mobile device comprising the GPS receiver is originally obtained through techniques including at least one:
   triangulation between radio towers,
   obtaining a range of locations corresponding to a transmission range of a single radio tower,
   advance forward link trilateration (AFLT),
   observed time difference (OTD), and
   Cell-ID (CID).

5. The system of claim 1, wherein the central processing unit is programmed to transmit the location of the vehicle or the freight carried by the vehicle to at least one of:
   a freight service provider,
   a party to whom the freight service provider provides freight services, or
   a party that provides location information services to the freight service provider or to the party to whom the freight service provider provides freight services.

6. The system of claim 1, wherein the request for the location of the vehicle or the freight carried by the vehicle is received from a device associated with:
   a freight service provider,
   a party to whom the freight service provider provides freight services, or
   a party that provides location information services to the freight service provider or to the party to whom the freight service provider provides freight services.

7. The system of claim 1, wherein the location of the vehicle or the freight carried by the vehicle is estimated based at least in part on the mobile device being associated with the vehicle or a driver of the vehicle.

8. A system for obtaining location of a vehicle or freight carried by a vehicle, the system comprising:
   a server comprising a central processing unit, a memory, a clock, and a server communication transceiver that receives location information of a mobile device, the mobile device comprising a GPS receiver, a microprocessor and a wireless communication transceiver coupled to the GPS receiver, the mobile device programmed to receive data sent by a plurality of GPS satellites, calculate location information of the mobile device comprising the GPS receiver and transmit the location information, the central processing unit programmed to:
   receive a request for the location of the vehicle or the freight carried by the vehicle, request the location information of the mobile device comprising the GPS receiver from a location information provider corresponding to a device other than the mobile device and associated with one or more of:
  a wireless service provider providing wireless service to the mobile device,
  a third party obtaining the location information from the wireless service provider providing wireless service to the mobile device, and
  a party that has access to the location information, but is other than the wireless service provider or the third party that obtains the location information from the mobile service provider; and
receive the location information of the mobile device comprising the GPS receiver from the location information provider corresponding to the device other than the mobile device;
estimate the location of the vehicle or the freight carried by the vehicle based on the location information of the mobile device comprising the GPS receiver; and
transmit the location of the vehicle or the freight carried by the vehicle as estimated for visual representation on a display,
wherein the central processing unit is further programmed to:
  receive data that indicates consent to transmission of the location information of the vehicle or the freight carried by the vehicle.

9. The system of claim 8, wherein the location information of the mobile device comprising the GPS receiver is originally obtained using a technique utilizing the GPS receiver that forms part of the mobile device.

10. The system of claim 8, wherein the location information of the mobile device comprising the GPS receiver is originally obtained using a method that does not require a GPS receiver to form part of the mobile device.

11. The system of claim 8, wherein the location information of the mobile device comprising the GPS receiver is originally obtained through techniques including at least one:
  triangulation between radio towers,
  obtaining a range of locations corresponding to a transmission range of a single radio tower,
  advance forward link trilateration (AFLT),
  observed time difference (OTD), and
  Cell-ID (CID).

12. The system of claim 8, wherein the central processing unit is programmed to transmit the location of the vehicle or the freight carried by the vehicle to at least one of:
  a freight service provider,
  a party to whom the freight service provider provides freight services, or
  a party that provides location information services to the freight service provider or to the party to whom the freight service provider provides freight services.

13. The system of claim 8, wherein the request for the location of the vehicle or the freight carried by the vehicle is received from a device associated with:
  a freight service provider,
  a party to whom the freight service provider provides freight services, or
  a party that provides location information services to the freight service provider or to the party to whom the freight service provider provides freight services.

14. The system of claim 8, wherein the location of the vehicle or the freight carried by the vehicle is estimated based at least in part on the mobile device being associated with the vehicle or a driver of the vehicle.

15. A system for monitoring location of at least one of a vehicle or freight carried by the vehicle, the system comprising:
  a mobile device comprising a GPS receiver, a display, a microprocessor and a wireless communication transceiver coupled to the GPS receiver, the mobile device programmed to receive data sent by a plurality of GPS satellites, calculate location information of the mobile device comprising the GPS receiver and transmit the location information;
  a server comprising a central processing unit, a memory, a clock, and a server communication transceiver that receives the location information of the mobile device comprising the GPS receiver, and the central processing unit programmed to:
  determine whether consent was given to transmission of location information of the mobile device;
  receive a request for information regarding the location of the at least one of the vehicle or the freight carried by the vehicle;
  request location information of the mobile device from a location information provider corresponding to a device other than the mobile device;
  receive the location information of the mobile device from the location information provider;
  estimate the location of the vehicle or the freight carried by the vehicle based on the location information of the mobile device; and
  transmit the location of the vehicle or the freight carried by the vehicle for visual representation on a display.

16. The system of claim 15, wherein the location information provider corresponds to a device associated with at least one of:
  a wireless service provider providing wireless service to the mobile device,
  a third party that obtains the location information of the mobile device from the wireless service provider providing wireless service to the mobile device, and
  a party that has access to the location information of the mobile device but is other than the wireless service provider or the third party that obtains the location information of the mobile device from the wireless service provider.

17. The system of claim 15, wherein the location information of the mobile device is originally obtained using a method including a technique utilizing the GPS receiver that forms part of the mobile device.

18. The system of claim 15, wherein the location information of the mobile device is originally obtained using a method including a technique other than a technique utilizing the GPS receiver that forms part of the mobile device.

19. The system of claim 15, wherein the location information of the mobile device comprising the GPS receiver is originally obtained through techniques including at least one:
  triangulation between radio towers,
  obtaining a range of locations corresponding to a transmission range of a single radio tower,
  advance forward link trilateration (AFLT),
  observed time difference (OTD), and
  Cell-ID (CID).

20. The system of claim 15, wherein the central processing unit is programmed to transmit the location of the vehicle or the freight carried by the vehicle as estimated for visual representation on a display by exposing an application programming interface (API) from which the location of the at least one of the vehicle or the freight carried by the vehicle is obtained.

21. The system of claim 15, wherein the central processing unit is programmed to transmit the location of the vehicle or the freight carried by the vehicle as estimated for visual representation on a display by interfacing with an exposed application programming interface (API) through which the location of the at least one of the vehicle or the freight carried by the vehicle is transmitted.

22. The system of claim 15, wherein the request for information regarding the location of the at least one of the vehicle or the freight carried by the vehicle is received from a device associated with:
 a freight service provider,
 a party to whom the freight service provider provides freight services, or
 a party that provides location information services to the freight service provider or to the party to whom the freight service provider provides freight services.

23. A system for obtaining location of a vehicle or freight carried by a vehicle, the system comprising:
 a server comprising a central processing unit, a memory, a clock, and a server communication transceiver that receives location information of a mobile device, the mobile device comprising a GPS receiver, a microprocessor and a wireless communication transceiver coupled to the GPS receiver, the mobile device programmed to receive data sent by a plurality of GPS satellites, calculate location information of the mobile device comprising the GPS receiver and transmit the location information, the central processing unit programmed to:
 determine whether consent was given to transmission of location information of the mobile device;
 receive a request for information regarding the location of the at least one of the vehicle or the freight carried by the vehicle;
 request location information of the mobile device from a location information provider corresponding to a device other than the mobile device;
 receive the location information of the mobile device from the location information provider;
 estimate the location of the vehicle or the freight carried by the vehicle based on the location information of the mobile device; and
 transmit the location of the vehicle or the freight carried by the vehicle as estimated for visual representation on a display.

24. The system of claim 23, wherein the location information provider corresponds to a device associated with at least one of:
 a wireless service provider providing wireless service to the mobile device,
 a third party that obtains the location information of the mobile device from the wireless service provider providing wireless service to the mobile device, and
 a party that has access to the location information of the mobile device but is other than the wireless service provider or the third party that obtains the location information of the mobile device from the wireless service provider.

25. The system of claim 23, wherein the location information of the mobile device is originally obtained using a method including a technique utilizing the GPS receiver that forms part of the mobile device.

26. The system of claim 23, wherein the location information of the mobile device is originally obtained using a method including a technique other than a technique utilizing the GPS receiver that forms part of the mobile device.

27. The system of claim 23, wherein the location information of the mobile device comprising the GPS receiver is originally obtained through techniques including at least one:
 triangulation between radio towers,
 obtaining a range of locations corresponding to a transmission range of a single radio tower,
 advance forward link trilateration (AFLT),
 observed time difference (OTD), and
 Cell-ID (CID).

28. The system of claim 23, wherein the central processing unit is programmed to transmit the location of the vehicle or the freight carried by the vehicle by exposing an application programming interface (API) from which the location of the at least one of the vehicle or the freight carried by the vehicle is obtained for visual representation on a display.

29. The system of claim 23, wherein the central processing unit is programmed to transmit the location of the vehicle or the freight carried by the vehicle by interfacing with an exposed application programming interface (API) through which the location of the at least one of the vehicle or the freight carried by the vehicle is transmitted for visual representation on a display.

30. The system of claim 23, wherein the request for information regarding the location of the at least one of the vehicle or the freight carried by the vehicle is received from a device associated with:
 a freight service provider,
 a party to whom the freight service provider provides freight services, or
 a party that provides location information services to the freight service provider or to the party to whom the freight service provider provides freight services.

\* \* \* \* \*